(12) United States Patent
Ceccarini

(10) Patent No.: US 11,565,929 B2
(45) Date of Patent: Jan. 31, 2023

(54) MONITORING SYSTEM AND METHOD FOR DETECTING AND MONITORING THE SANITIZATION PROCESS

(71) Applicant: Celli S.p.A., San Giovanni in Marignano (IT)

(72) Inventor: Daniele Ceccarini, San Giovanni in Marignano (IR)

(73) Assignee: Celli S.p.A., San Giovanni in Marignano (IT)

( * ) Notice: Subject to any disclaimer, the term of this patent is extended or adjusted under 35 U.S.C. 154(b) by 438 days.

(21) Appl. No.: 16/635,169

(22) PCT Filed: Aug. 9, 2018

(86) PCT No.: PCT/IT2018/050151
§ 371 (c)(1),
(2) Date: Jan. 30, 2020

(87) PCT Pub. No.: WO2019/030790
PCT Pub. Date: Feb. 14, 2019

(65) Prior Publication Data
US 2021/0087042 A1    Mar. 25, 2021

(30) Foreign Application Priority Data

Aug. 9, 2017   (IT) .................. 102017000092014

(51) Int. Cl.
*B67D 1/07*   (2006.01)
*B08B 9/032*   (2006.01)
(Continued)

(52) U.S. Cl.
CPC ............. *B67D 1/07* (2013.01); *B08B 9/0325* (2013.01); *B67D 1/0888* (2013.01); *G05B 13/02* (2013.01); *B67D 2001/075* (2013.01)

(58) Field of Classification Search
CPC ...... B67D 1/0867; B67D 1/07; B67D 1/0888; B67D 2001/075; B67D 1/0884;
(Continued)

(56) References Cited

U.S. PATENT DOCUMENTS

| 2002/0088823 | A1* | 7/2002 | Tabacchi | B67D 1/1234 |
| | | | | 222/52 |
| 2006/0113322 | A1  | 6/2006 | Maser et al. | |
| 2017/0233238 | A1* | 8/2017 | Bryant | B67D 1/1252 |
| | | | | 62/126 |

FOREIGN PATENT DOCUMENTS

| GB | 2529222    | 2/2016 |
| JP | 2004-18882 | 4/2004 |

(Continued)

OTHER PUBLICATIONS

International Search Report and the Written Opinion dated Dec. 4, 2018 From the International Searching Authority Re. Application No. PCT/IT2018/050151. (13 Pages).

(Continued)

*Primary Examiner* — Vishal Pancholi
*Assistant Examiner* — Robert K Nichols, II

(57) ABSTRACT

The invention relates to a monitoring system for controlling a plant, such as a beverage dispensing plant, said plant being comprising one or more apparatuses connected to one another or to other apparatuses external to said plant by electrical, pneumatic or hydraulic lines. The monitoring system comprises a plurality of detection sensors ($S_{power}$, $S_{CO_2}$, $T_{ambiente\ (bevanda)}$, $T_{ambiente\ (impianto)}$, $S_{p\_Aria}$) sensor, positioned on at least one of said electrical, pneumatic or hydraulic lines, and a monitoring unit, provided with transceiver means and connected to said detection sensors, is configured to receive the data detected by said detection sensors, determine the values and trends over time of the respective parameters of said detection sensors by compar- (Continued)

ing them with average variable values and/or trends to verify the operation of said plant. The invention also relates to a method for detecting and monitoring the sanitization of a beverage dispensing plant.

16 Claims, 5 Drawing Sheets

(51) Int. Cl.
  *B67D 1/08* (2006.01)
  *G05B 13/02* (2006.01)
(58) Field of Classification Search
  CPC ..... B67D 1/0406; F25B 49/02; B08B 9/0325; G05B 13/02
  See application file for complete search history.

(56) References Cited

FOREIGN PATENT DOCUMENTS

| JP | 2015-119329 | 6/2015 |
| WO | WO 2019/030790 | 2/2019 |

OTHER PUBLICATIONS

Rapporto di Ricerca e Opinione Scritta [Search Report and Written Opinion] dated May 25, 2018 From the Ministero Dello Sviluppo Economico, Direzione Generale Sviluppo Produttivo e Competitivita, Ufficio Italiano Brevetti e Marchi Re. Application No. IT 201700092014. (9 Pages).
Bozzetti "PCT LiveWorx 2019 Boston, MA. Great Success of the IntelliDarught Platform at the PCT Event", Celli News. 45: 34-35, Nov. 2019.
Celli Group "IntelliDraught: Cell Innovation for Internet of Things", Celli Group, Brochure. 4 P., Jan. 2017.
Ottaviani "Celli IntelliDraught the Revolution of Telemetry", Cell News, 42: 30-31, Nov. 2016.
Ottaviani "IntelliDraught Even More Connected", Celli News, 44: 36, Nov. 2018.
Ottaviani "The Winner Is . . . Celli Group! IntelliDraught Was Awarded the Barawards 2016 Prize!", Celli News, 43: 39, Sep. 2017.
Schiatti "IntelliFarught & Smart Equipment: Go-Go Digital Engagement", Celli News, 45: 31, Nov. 2019.

* cited by examiner

MONITORING SYSTEM AND METHOD FOR DETECTING AND MONITORING THE SANITIZATION PROCESS

RELATED APPLICATIONS

This application is a National Phase of PCT Patent Application No. PCT/IT2018/050151 having International filing date of Aug. 9, 2018, which claims the benefit of priority of Italian Patent Application No. 102017000092014 filed on Aug. 9, 2017. The contents of the above applications are all incorporated by reference as if fully set forth herein in their entirety.

FIELD AND BACKGROUND OF THE INVENTION

The invention relates to a monitoring system and method for detecting and monitoring the sanitization process.

In greater detail, the invention relates to a centralized system for connecting, monitoring and controlling plants of the type mentioned, which was studied and made in particular to allow detecting the status of the various components of a plant designed to dispense beer, water, juices, carbonated beverages and in general any type of beverage that may be dispensed from a tap, but that may be used for any plant consisting of various components or units, each of which designed for a specific operating function.

The description below relates to controlling the dispensing of beverages such as beer and the like, but it is quite apparent how the same should not be considered limited to this specific use.

As is currently well known in the modern field of the Internet of Things (IOT), monitoring systems are known which by using specific appropriate sensors, measure and transmit information on the operation of the monitored system to a central database, the information aimed in particular to analyse the plant pool installed, to diagnose, to perform a predictive diagnosis, to analyse energy efficiency, etc.

Within the scope of beverage dispensing devices, systems are also known in the field for monitoring consumption and the operation of the units of the dispensing plants.

For example, in a cellar, a coffee shop or a pub, these system often consist of a group of various mechanical devices now provided with electronic control systems, each manufactured by a specific manufacturer.

The coordinated monitoring and controlling of plants currently is increasingly requested. This has resulted in the emergence of centralized monitoring systems that allow the operators to perform effective scheduling with subsequent savings from an economical viewpoint.

It in general is possible to carry out centralized monitoring using a system comprising a central control unit, a plurality of plants functionally connected to one another, each comprising one or more integrated sensors. Each sensor is designed to measure appropriate physical parameters, such as temperature, flow rate, volume and the like, so as to control specific operating processes and detect any malfunctioning thereof.

The systems according to the background art therefore are based on "proprietary" systems where it in general is possible to introduce sensors in these devices and plants.

Nevertheless, in general public establishments such as breweries, pubs and the like comprise systems provided with plants made by other manufacturers. In the case wherein the various manufacturers share communication protocols, it is possible to "implement" said plants "in the system" by connecting them with a control unit.

However, this currently is infrequent.

One possibility is the one of inserting appropriate sensors in the non-integrated plants that are compatible with the central control unit.

However, such option also may not be suitable and in general there is a risk of damaging the system.

In certain cases, it is prohibited by the manufacturer of the plant or device to be integrated in the control system, or even by regulations because such structural modification would invalidate the original manufacturer's safety certification.

It is apparent how that described above makes this procedure costly from an economical and technical viewpoint.

The background art includes the monitoring systems described in patent applications US2006/113322 A1 and GB2529222 A.

Such systems in general make possible a static monitoring of certain parameters of apparatuses designed to dispense beverages.

However, among the limits that such systems have is the fact that the measurements proposed in general are limited.

Moreover, the described sanitization monitoring procedures in such systems do not allow any detection of the quality of the sanitization process carried out.

In addition to that above, such monitoring systems in the field comprise procedures for detecting sanitization operations of the hydraulic plant. Such operations in particular are important because they comprise the passage of cleaning substances that must not in any case be mixed with the beverage to be dispensed.

In certain systems, like the one described in the aforementioned patent application US 2006/113322 A1, a method based on the measurement of the flow of the line and of the composition of the liquid is used to understand when the sanitization occurs.

However, although such method recognizes the sanitization that occurred, it does not provide information concerning the quality of the sanitization process.

SUMMARY OF THE INVENTION

In light of the above, the aim of the invention is therefore to propose a monitoring system that does not have the limits and the problems of the background art.

It is also an aim of the invention to propose a monitoring system suitable for controlling plants for dispensing beverages.

Another aim of the invention is to propose an operating method of the monitoring system.

A monitoring system for controlling a plant, such as a system for dispensing beverages and the like, therefore forms a specific object of the invention, said plant being of the type comprising one or more apparatuses connected to one another or to other apparatuses external to said plant, by electrical, pneumatic or hydraulic lines, wherein said monitoring system comprises a plurality of detection sensors for detecting a corresponding physical parameter for each sensor, wherein at least one of said detection sensors is positioned on at least one of said electrical, pneumatic or hydraulic lines, and a monitoring unit provided with transceiver means and connected to said detection sensors, wherein said monitoring unit is configured to receive the data detected by said detection sensors, determine the values and trends over time of the respective parameters of said detection sensors by comparing them with average variable values and/or trends so as to detect and verify the operation of said control system in one or more operating steps, and wherein said monitoring unit is also configured to execute correlation operations between said parameters to verify the operation of said plant.

Again according to the invention, said plant comprises at least one hydraulic line for implementing hydraulic valves and said pressure sensor may be interposed between a first and a second apparatus of said plant to detect the implementation pressure of said hydraulic valves so as to determine the quantity of dispensed beverage on the basis of the flow rate of the beverage dispensing conduits. Again according to the invention, one or more of said apparatuses may comprise one or more internal sensors installed internally, designed to detect physical operating parameters of the respective apparatus, said internal sensors being operatively connected with said monitoring unit for the transmission of the detected data related to said physical operating parameters.

Advantageously according to the invention, said system may comprise at least one power sensor for detecting the absorption of power or energy of said at least one of the apparatuses, said at least one power sensor being positioned to detect the energy absorbed, defined as the sum between the energy of the ice bank, given by the consumption of energy required to preserve the ice bank due to the outward exchange of the plant, and the cooling energy, given by the consumption to cool the beverage consumed, said monitoring unit is connected to said at least one power sensor, may comprise one or more sensors of the ambient temperature surrounding said plant to be monitored, wherein said temperature sensors are connected to said monitoring unit, may detect the quantity of beverage dispensed by said plant to be monitored, wherein such quantity of dispensed beverage is available to said monitoring unit and said monitoring unit may carry out said correlation operations by verifying if the overall energy absorbed by said plant is comprised within a pair of curves given by the sum of two pairs of absorption curves, where the first pair of absorption curves is dynamically variable as a function of the ambient temperature surrounding said plant, and the second pair of absorption curves is dynamically variable as a function of the quantity of beverage dispensed by said plant, so as to determine that said plant operates properly, otherwise determining that said plant does not operate properly.

Furthermore according to the invention, said sensors comprise one or more pressure sensors of the carbon dioxide of the respective beverage containers, which are connected to said monitoring unit, in that it comprises one or more sensors of the ambient temperature where said beverage containers are stored, which are connected to said monitoring unit, and said monitoring unit may carry out said correlation operations by verifying if the carbon dioxide pressure falls within a pair of pressure curves that are dynamically variable as a function of the ambient temperature where said beverage containers are stored such that if said carbon dioxide pressure is within said pressure curves, then said monitoring unit determines that said plant operates properly, otherwise it determines that said plant (2) does not operate properly.

Again according to the invention, said power sensor may be interposed in the supply line of one or more of said apparatuses to detect the power absorbed thereby.

Again according to the invention, said system may comprise at least one electric interface having a female electrical socket in which there may be inserted the power supply plug of a respective apparatus to be monitored, a male electrical socket that is connectable to a supply source, said power sensor being inserted between said female electrical socket and said male electrical plug.

Advantageously according to the system, said power sensor may comprise a voltage meter and a Hall Effect current meter.

Preferably according to the invention, said dispensing plant for dispensing a beverage may comprise a dispensing apparatus, a cooling apparatus for cooling the beverage to be dispensed, a hydraulic line for connection between said dispensing apparatus and said cooling apparatus through which line said beverage to be dispensed passes, and a dispensing line output connected to said cooling apparatus, through which line the cooled beverage passes, a first power sensor interposed between the mains and said dispensing apparatus, which is connected to said monitoring unit, a second power sensor interposed between the mains and said cooling apparatus, which is connected to said monitoring unit, one or more pressure sensors for detecting the pressure of the beverage on said line of hydraulic line and on said dispensing line, which are connected to said monitoring unit.

Furthermore according to the invention, said dispensing apparatus may comprise a washing module adapted to start a sanitization process of said beverage dispensing plant at predefined and/or predefinable time intervals, and said monitoring unit may be configured to carry out the following steps: detection, wherein it detects the start of the sanitization process; acquisition, wherein it acquires the values over time of the parameters of said dispensing apparatus and said cooling apparatus; and analysis, wherein the data obtained related to said parameters of said dispensing apparatus and said cooling apparatus are analysed and the operation of the beverage dispensing plant is detected.

Again according to the invention, said detection step may comprise the following sub-steps: control, wherein the monitoring is started of the flows on said hydraulic line, on said dispensing line and of said sensors of said beverage dispensing plant; and verification if said pressure sensors have detected a sanitization; if positive, said acquisition step is started.

Furthermore according to the invention, said acquisition step may comprise the following sub-steps: recognition of the sanitization process; calculation by excluding the volumes of the sanitization from the ones of the beverage; detection of the signals or patterns over time of the volumes with the detection of a group of parameters; and calculation of a group of sanitization quality indexes.

Advantageously according to the invention, said group of parameters may comprise the following parameters: V1: volume from the beginning of sanitization to the first pause; Tsan_active: pause time after volume V1; Vrins: volume from the first pause to the last pause; Vbeer: volume from the last pause to procedure end; Tsan_tot: total procedure time; and said group of indexes may comprise the following indexes: Sanitizing activation time: Tsan_active; Total procedure time: Tsan_tot; Rinsing index: Vrins/Vbeer; Sanitization period: time from the last sanitization process; Ratio between sanitizing volume and plant capacity.

Again according to the invention, said analysis step may comprise the following sub-steps: comparison of the value of the data related to said parameters of said dispensing apparatus and said cooling apparatus with objective average values; if said comparison shows worsening values with respect to said average values, signalling the need to perform a maintenance operation; if said comparison shows improved values with respect to said average values, detection of the optimal operation of the monitoring system; and update of the average reference values with those of the last indexes detected and calculated.

A further object of the invention is a method for detecting and monitoring the sanitization of a beverage dispensing plant, said plant having a dispensing apparatus and a cooling apparatus, said method comprising the following steps: detection of the start of a sanitization process; acquisition of the values over time of the parameters of said dispensing apparatus and said cooling apparatus; and analysis, wherein the data obtained related to said parameters of said dispensing apparatus and said cooling apparatus are analysed and the operation of the beverage dispensing plant is detected; characterised in that said acquisition step comprises the following sub-steps: recognition of the sanitization process; calculation by excluding the volumes of the sanitization from the ones of the beverage; detection of the signals or patterns over time of the volumes with the detection of a group of parameters; and calculation of a group of sanitization quality indexes.

Again according to the invention, said detection step may comprise the following sub-steps: control, wherein the monitoring is started of the beverage flows on a hydraulic line and/or on a dispensing line and/or of sensors of said beverage dispensing plant; and verification if said pressure sensors have detected a sanitization; if positive, said acquisition step is started.

Again according to the invention, said group of parameters comprises the following parameters: V1: volume from the beginning of sanitization to the first pause; Tsan_active: pause time after volume V1; Vrins: volume from the first pause to the last pause; Vbeer: volume from the last pause to procedure end; Tsan_tot: total procedure time; and said group of indexes may comprise the following indexes: Sanitizing activation time: Tsan_active; Total procedure time: Tsan_tot; Rinsing index: Vrins/Vbeer; Sanitization period: time from the last sanitization process; Ratio between sanitizing volume and plant capacity.

Advantageously according to the invention, said analysis step may comprise the following sub-steps: comparison of the value of the data related to said parameters of said dispensing apparatus and said cooling apparatus with objective average values; if said comparison shows worsening values with respect to said average values, signalling the need to perform a maintenance operation; if said comparison shows improved values with respect to said average values, detection of the optimal operation of the monitoring system; and update of the average reference values with those of the last indexes detected and calculated.

BRIEF DESCRIPTION OF THE SEVERAL VIEWS OF THE DRAWINGS

The invention is now described, by way of example and without limiting the scope of the invention, with reference to the accompanying drawings which illustrate preferred embodiments of it, where.

In the various figures, similar parts are labelled with the same reference numerals.

DESCRIPTION OF SPECIFIC EMBODIMENTS OF THE INVENTION

Figure 1:
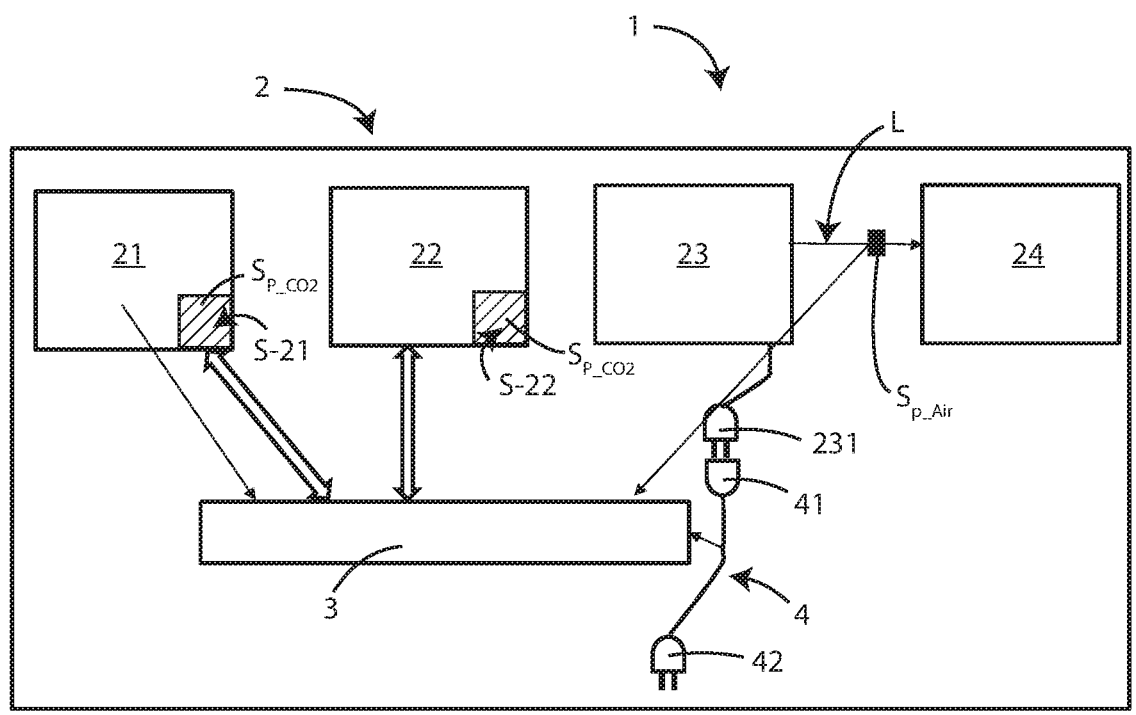
FIG. 1 shows a basic schematic view of a control system according to the invention.

With reference to FIG. 1, it is worth noting a basic diagram of a monitoring system 1 according to the invention, for controlling a plant for dispensing drinks such as beer, carbonated beverages and the like, of multi-interface type, that is capable of interfacing with sensors installed on apparatuses according to different methods.

The monitoring system 1 comprises a plant 2 in turn having a plurality of apparatuses 21, . . . , 24 also positioned in series with one another, and a monitoring unit 3, opportunely operatively connected to said plants 21, . . . , 24 to detect operating parameters using sensors, as better described below.

In particular, the various plants 21, . . . , 24 in the schematic embodiment depicted in FIG. 1 are connected to the monitoring unit 3 in a separate manner.

More specifically, the apparatus 21 comprises internal sensors S-21 or pre-installed sensors, directly connected to the monitoring unit 3 so that the latter may monitor the apparatus 21 in a direct manner. Said internal sensors S-21 are designed to detect various operating parameters of the plant, such as the electric power or overall energy absorbed, the power or energy absorbed by certain specific components (compressor, pumps . . . ), the temperature of the product, the volumes of beverages dispensed at ambient temperature and the pressure of carbon dioxide ($CO_2$). By detecting and analysing such parameters, the monitoring unit 3 is capable of detecting the status of the apparatus 21 in real time, as better described below.

The apparatus 22 too comprises internal sensors S-22, which are connectable in a compatible manner with the monitoring unit 3, such that here too, the latter may monitor the apparatus 22 in a direct manner and in a similar manner to apparatus 21. Here too, the internal sensors S-22 are directly installed in the apparatus 22 to be monitored.

That indicated above in general is possible when the manufacturer of the apparatus to be monitored is the same as the one that makes the monitoring unit 3 or when the internal sensors S-22 possibly installed have no effect on legal/safety provisions and the like. The digital communication protocol in the apparatus 22 is public/open or is shared by manufacturers. Here too, the monitoring unit 3 may be directly connected with the internal sensors S-22 installed in the apparatus 22, thus detecting the values thereof of the parameters measured.

The apparatuses 23 and 24 do not have internal sensors. Therefore, the monitoring unit 3 may not detect parametric operating values in a direct manner.

Unlike the apparatuses 21 and 22, the apparatus 23 does not have sensors installed internally. The apparatus 23 comprises an electric interface 4 (better described below) interposed between the power supply plug 231 and the mains, designed to measure the voltage and the supply current of the apparatus 23.

Moreover, said apparatus 23 is connected in a "physical" manner to said apparatus 24 by a connection line L. Such line L may be an electric power, pneumatic or hydraulic line, or any other type of physical connection possible between two apparatuses or a combination of said lines.

In the case at hand, reference may be made to a pneumatic line L, designed to drive valves of various type, such as the ones for dispensing beverages. In particular, a pneumatic circuit installed downstream acts on the line L, which circuit modifies the position of the valves as a function of the pressurization or non-pressurization of the line itself.

A pressure sensor $S_{p\_Aria}$ (external) is installed in said pneumatic line L, which as is noted, does not have connections with internal components of said apparatuses 23 or 24, therefore not modifying the manufacturer's safety or operating features thereof. Said monitoring unit 3 is connected to said pressure sensor $S_{p\_Aria}$, thus detecting in real time the air pressure on the pneumatic line L, thus knowing the status of the plant (for example, if it is carrying out a sanitization operation, as is better explained below). In particular, by measuring the pressure values over time of the beverage or of the liquid passing through a dispensing conduit driven by a valve controlled by the pneumatic line L (as better described below), it is possible—knowing the flow rate of the conduit—to determine and/or calculate the value of the liquid volume passing through it.

The pressure of the beverage to be dispensed (e.g. beer, carbonated beverages) is detected through the detection of the pressure of the carbon dioxide ($CO_2$) of the beverage container. Such pressure is detected with a specific sensor $S_{CO2}$.

In particular, as is known in the field, in general a beverage that is to be dispensed carbonated, such as beer and the like, in general is contained in a container or drum.

The dispensing conduit of the beverage in general is connected to the lower part of the drum. Following the beverage dispensing, an empty space is created in the upper part of the drum, which may cause the loss of carbon dioxide of the beverage, that is resulting in a significant loss of quality thereof in the subsequent dispensing operations.

To avoid such phenomenon, the volume left by the beer dispensing operations is compensated for with carbon dioxide introduced in the drum at an appropriate pressure to avoid the beverage itself from losing gas or becoming too carbonated.

Such optimal pressure is—for the equation of perfect gases—proportional to the temperature, in addition to the density of carbon dioxide diluted in the beverage, which in general is typical of the specific beverage, which is constant and is provided by the beverage manufacturer.

Therefore, the apparatuses 21, . . . , 24 of a plant in general comprise respective carbon dioxide pressure sensors $S_{p\_CO2}$.

Another type of parameters that the monitoring system 1 is capable of measuring related to each apparatus 21, . . . , 24 of the plant to be monitored, is the energy consumed.

More specifically, the plant 2 to be monitored comprises a cooling machine therein.

The energy consumption typical of a so-called "ice bank" cooling machine is mainly given by two items:

Energy=EnergyIce_Bank+Energy_Cooling

The first item (Energy_Ice_Bank), which as is known in general is known as the predominant item, is the consumption of energy required to preserve the ice bank due to the exchange of the machine outwards, and mainly consists of the efficiency of the machine and the ambient temperature where the machine is located. Therefore, such item is not constant but is given by the size and type of plant and by the ambient temperature where it is located.

The second item (Energy_Cooling) is the consumption for cooling the beverage consumed, and increases proportionately to the quantity of dispensed beverage.

Therefore, to assess if the plant 2 is operating as expected, or if there is a malfunction, there is a need to verify that the consumption of energy or of the power of the plant 2 itself or of the apparatuses 21, . . . , 24 forming it, which is detected with appropriate sensors, falls within a range given by the type of plant 2, by the ambient temperature $T_{ambiente}$ where the plant 2 is located, and by the quantity of beverage consumed $Q_{bevanda}$ which, as described above, is detected by the monitoring system 1 also in an indirect manner, i.e. through the pressure of the beverage and the flow rate of the conduit.

As indicated above, the detection of the proper operation of the plant 2 occurs using a correlation analysis of the information detected by the various sensors of the monitoring system 1.

In particular, with regards to the quality of the beverage dispensing, the carbon dioxide pressure in each beverage drum is detected by detecting the carbon dioxide pressure using the above-indicated pressure sensor $S_{p\_CO2}$. At the same time, the temperature $T_{ambiente\ (bevanda)}$ of the ambient where the drums of the beverage (for example, beer) are stored, is also detected.

As the temperature $T_{ambiente\ (bevanda)}$ of the ambient where the beverage is stored varies, the carbon dioxide pressure inside the drums simultaneously requires varying.

The correlation analysis is performed between said two variables or parameters.

It is known that the pressure of the carbon dioxide ($CO_2$) of beer (or of any premixed carbonated beverage) is to be opportunely selected as a function of the carbon dioxide ($CO_2$) content thereof, and also of the storing temperature conditions thereof.

The optimal pressure for the carbon dioxide ($CO_2$) is therefore also a function of the ambient temperature in addition to a function of the type of beverage (information, as mentioned above, generally provided by the manufacturer).

A pressure outside the optimal values generates a poor quality of the beverage by increasing or decreasing the concentration of carbon dioxide ($CO_2$) in the dispensed beverage, which therefore will be too carbonated or poorly carbonated.

Figure 4:
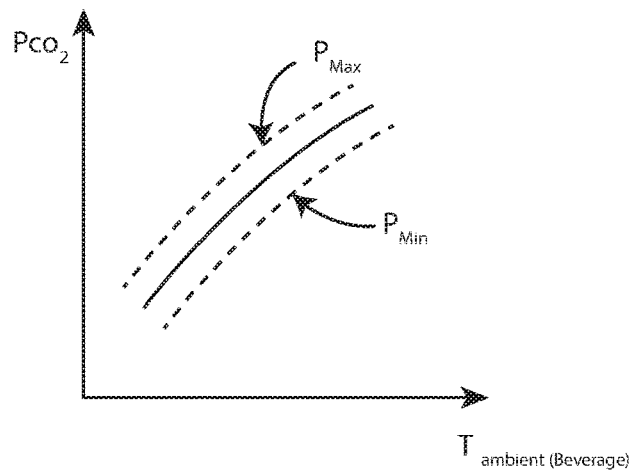
FIG. 4 shows a graph that indicates the quality trend of the pressure of carbon dioxide as a function of the ambient temperature surrounding the drums where the beverage to be dispensed is contained.

The monitoring system 1 according to the invention correlates the ambient temperature $T_{ambiente\ (bevanda)}$ in the area where the drums of the beverage to be dispensed are positioned with the pressure of carbon dioxide ($CO_2$) measured, as also shown in FIG. 4, which shows the quality trend of how the carbon dioxide pressure $P_{CO2}$ must always remain within an ideal pressure range between two maximum and minimum pressure curves, indicated with $P_{Max}$ and $P_{Min}$, respectively, which are functions of time.

In general, such two curves $P_{Max}$ and $P_{Min}$ are almost linear.

As mentioned, the monitoring system 1 also detects—using an appropriate thermometric sensor—the ambient temperature of the plant 2, indicated with $T_{ambiente\ (impianto)}$, the energy or the power absorbed by the plant through the power sensor $S_{power}$ and finally, the quantity of dispensed beverage $Q_{bevanda}$. As mentioned above, the latter parameter may be detected in a direct manner or through the size or diameter of the conduit of the beverage dispensing conduit, together with the pressure of the dispensed beverage measured over time.

In particular, by opportunely having at least one power sensor $S_{power}$, positioned so as to detect the total energy consumed, which we know is the sum of the above-described EnergyIce_Bank and the Energy_Cooling, it is possible to correlate such total energy value with the energy expected as a function of the ambient temperature of the plant $T_{ambiente\ (impianto)}$ of the quantity of beverage $Q_{bevanda}$.

It is worth noting that when the plant 2 being monitored does not dispense beverage, the power sensor $S_{power}$ detects the EnergyIce_Bank alone, while during the dispensing, said sensor $S_{power}$ detects the total energy consumed, that is as mentioned above, the sum of the EnergyIce_Bank and the Energy_Cooling.

Figure 5:
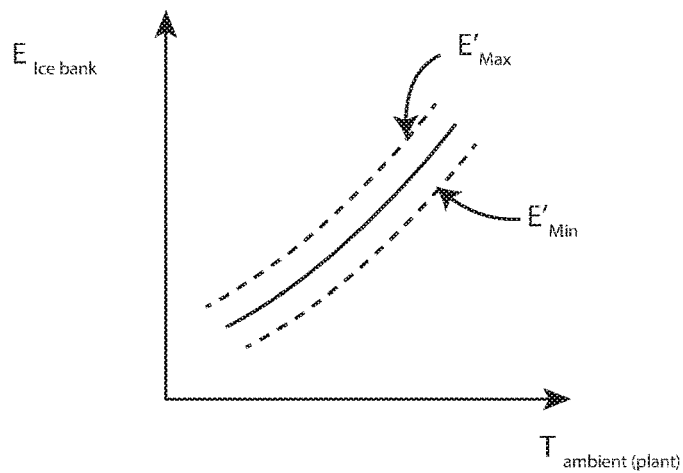
FIG. 5 shows a graph that indicates the quality trend of the energy absorbed by a plant to preserve the ice bank as a function of the ambient temperature surrounding the plant.
Figure 6:
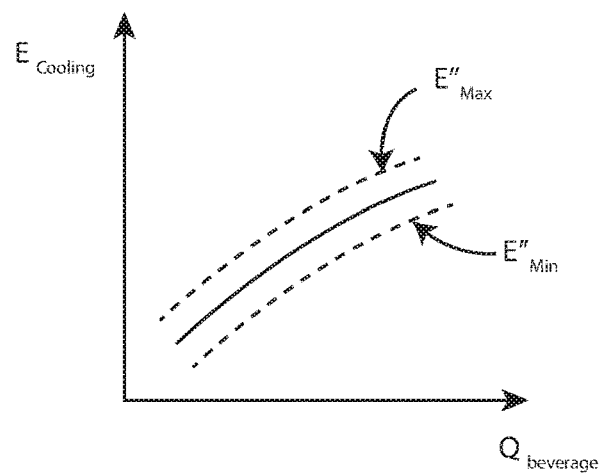
FIG. 6 shows a graph that indicates the quality trend of the energy absorbed by a plant to cool the beverage as a function of the quantity of dispensed beverage.

The variable quality trends of such parameters, detected by the sensors of the monitoring system 1, are depicted in FIGS. 5 and 6, where there are shown the EnergyIce_Bank of the plant 2 as a function of the ambient temperature $T_{ambiente\ (plant)}$ of the plant 2, and the Energy_Cooling as a function of the quantity of beverage dispensed $Q_{bevanda}$ by plant 2, respectively.

As is shown, the EnergyIce_Bank (or the power) absorbed is to remain within two curves $E'_{Max}$ and $E'_{Min}$.

Simultaneously, the Energy_Cooling is also to remain within two curves $E''_{Max}$ and $E''_{Min}$.

The proper operation of the plant is detected so that the total energy consumed remains within the sum of the two above-indicated pairs of curves, $E'_{Max}$ and $E'_{Min}$ and $E''_{Max}$ and $E''_{Min}$.

Such correlation analyses are not considered in the background art because the ambient temperature where the plant 2 and the beverage containers often are located is controlled and the quantity of dispensed beverage is rather small.

However, applications are increasingly frequent where the ambient where the plant 2 and the beverage containers are located is not at a controlled temperature; just like the quantity of beverage may be non-negligible in the calculation of the energy related to the energy for preserving the ice bank.

For this reason, there is a need to apply a correlation in calculating the malfunctioning thresholds.

Using the above-indicated system, the monitoring unit 3 may simultaneously detect the electric power absorbed by the apparatus 23 and the pressure on the pneumatic line L to activate pneumatic valves (not shown in the drawings) for dispensing the beverage and therefore the quantity of dispensed beverage $Q_{bevanda}$. Thus, it is possible to compare the consistency between the power (energy) absorbed and the quantity of product (for example beverage) transmitted to the apparatus 24 positioned downstream.

In a further embodiment, no measuring is carried out on the line L, while the pneumatic air pressure on another line in which the beverage does not pass, is measured. In this case, the flow rate of beverage is measured directly using for example, a flow rate sensor on the beverage line.

On the basis of appropriate correlation ranges, the monitoring unit 3 may thus detect any operating anomalies of the apparatuses 21, . . . , 24 both in a specific manner, that is for each of them, and in overall terms, by verifying the overall operating consistency of the plant 2 in the various operating steps, while assessing the aforesaid correlations each time.

It is worth noting that the minimum and maximum reference curves between which the pressure of the carbon dioxide $P_{CO2}$, the EnergyIce_Bank and the Energy_Cooling (indicated in FIGS. 4 to 6) is to be, respectively, may easily be obtained by a skilled expert by determining the appropriate optimal and preferred operating thresholds in the difference of ambient temperature where the beverage is stored or of the ambient of the plant or also the quantity of beverage generally dispensed by the plant 2 itself.

As mentioned, that described above is also possible without in any manner modifying the relative electrical circuits of the apparatuses 23 and 24.

In particular, by measuring the current absorbed by the device 23, the monitoring unit 3 detects the operating status thereof (for example, compressor refrigerator ON or OFF).

The device 23 has an electric power, pneumatic or hydraulic output that interfaces with another device or a charge, for example, a pneumatic line that acts on a pneumatic circuit installed downstream and that modifies the position of the valves as a function of the pressurization or non-pressurization of the line itself.

Given that the air pressure sensor $S_{p\_Aria}$ on such pneumatic line L is external to the apparatus 23, it obviously does not affect or modify the safety or operating features thereof.

It is worth noting from a practical viewpoint that by measuring the air pressure using the sensor and the power consumption of the apparatus 23, the monitoring unit 3 may "infer" through interface 4, that is assess the internal operating status of the apparatus 23 through a correlation analysis between the parameters detected as better described below; for example, it may detect which output valves are implemented and which ones are not, and it may know the operating status of the plant 2.

The electric interface 4 comprises a female electrical socket 41 in which there may be inserted the power supply plug of a respective apparatus to be monitored, a male electrical socket 42 that is connectable to a supply source, and a power sensor $S_{power}$ inserted between said female electrical socket 41 and said male electrical plug 42, such as a voltage meter and a Hall Effect current meter (not shown in the drawings).

Naturally in reference to FIG. 1, the apparatuses 21 and 22 provide the monitoring unit 3 with the absorbed power.

The monitoring unit 3 monitors and collects the data collected of the various apparatuses 21, . . . , 24 of said plant 2 by saving them as soon as they are detected in an appropriate memory medium with which it is provided (not shown in the drawings) and then transmitting them for example, over the Internet, telephone network or other, using appropriate transmission means with which it is provided.

From a functional viewpoint, the monitoring system 1 operates for the apparatuses 23 and 24 so as to observe the status of a dynamic system.

Figure 2:
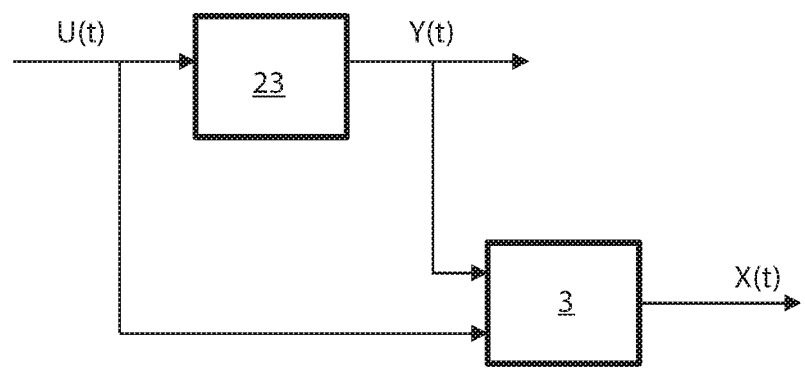
FIG. 2 shows an operating diagram of the system according to the invention.

In other words, considering the basic diagram in FIG. 2, the status X(t) may not be directly detected because it is not possible to install a sensor in an apparatus for detecting any functional parameter (such as for example, in apparatus 23, as shown in the drawing), but it is associated with the value of the inputs U(t) or the outputs Y(t), or is equal to one of them.

Figure 3:
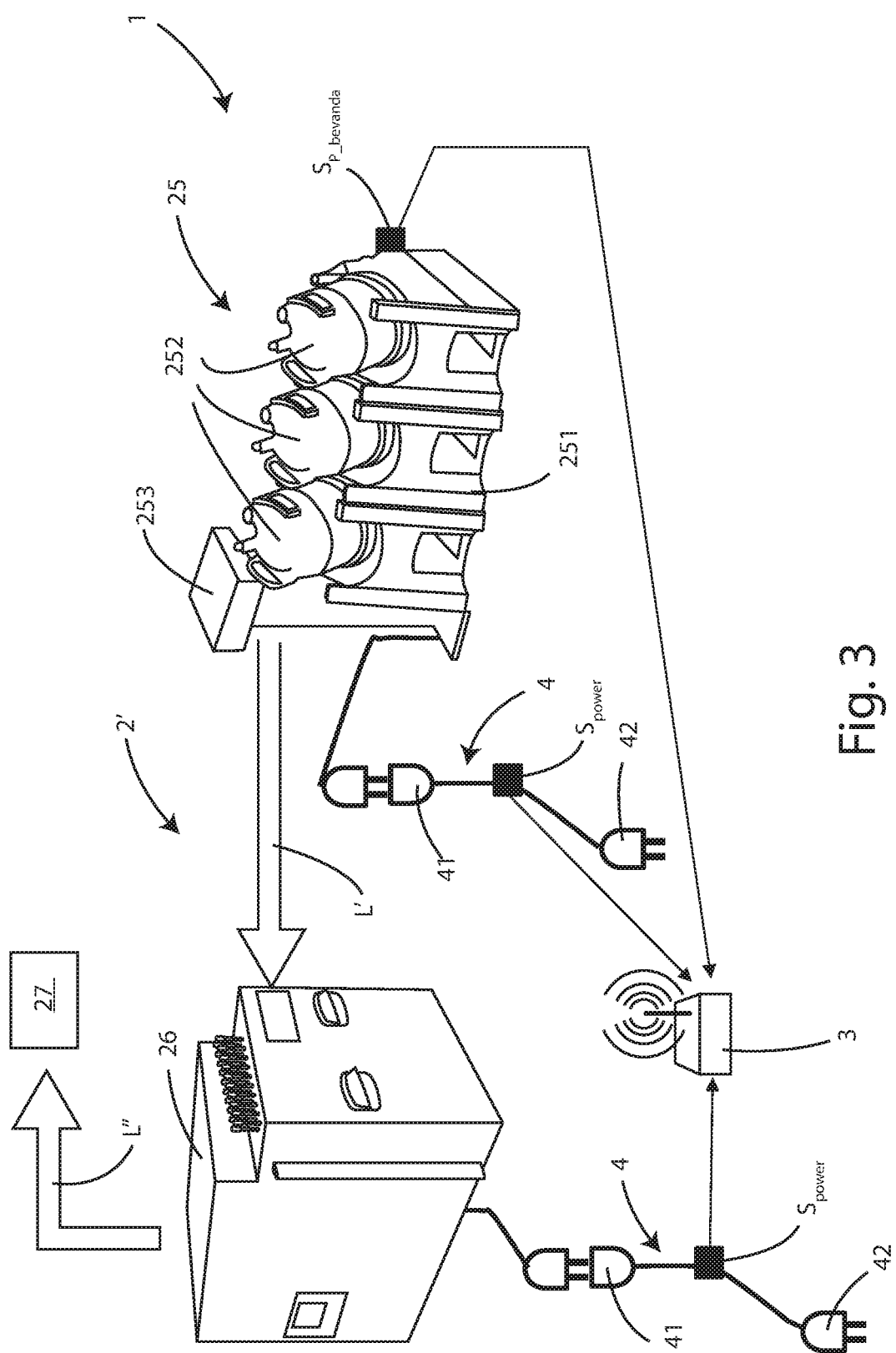
FIG. 3 shows a dispensing plant provided with a sanitization system, according to the invention.

In reference to FIG. 3, it is worth noting the diagram of a beer dispensing plant 2', of which in particular are shown, a drum management apparatus 25 and a cooling apparatus 26 of the beer to be dispensed, also more commonly called a cooler.

In the case at hand, neither of the two apparatuses 25 or 26 has internal sensors.

Said dispensing apparatus 25 comprises a support 251 and a plurality of containers or drums 252, which are generally kept pressurized as better explained below, so as to keep pressurized the beverage contained for dispensing, the containers or drums being installed on said support 251, each containing beer or a beverage in general.

Said dispensing apparatus 25 also comprises a washing module 253, which, with an appropriate hydraulic circuit, keeps each of said container or drum 252 modules pressurized, whose operation is described better below, and pressure sensors $S_{p\_bevanda}$ designed to detect the dispensing pressure output from said containers 252.

More specifically, the pressure sensors $S_p$ measure the pressure output from the containers 252, which in any case is generated by said washing module 253. The possible pressure for the sanitization is the pressure generated by the washing module 253 towards the containers 252. Following the generation of the pressure of said washing module 253, an internal system is used to decide whether to transmit it to the beer line, thus becoming output pressure of the beer, or to send it to valves on the containers 252, which force the passage of the sanitization water.

Said dispensing apparatus 26 is connected to the electric power supply line by an electric interface 4 provided with a power sensor $S_{power}$ connected in turn to said monitoring unit 3 to detect the power (that is the energy, given that the power is the energy transferred to the time unit) absorbed by said dispensing apparatus 25.

The cooling apparatus 26 is connected to said dispensing apparatus 25 through the hydraulic line L', by means of which dispensing apparatus the beer or the beverage in general to be dispensed is transmitted, in operating conditions.

Also said cooling apparatus 26 is connected to the electric power supply line by an electric interface 4 provided with a power sensor $S_{power}$ connected in turn to said monitoring unit 3 to detect the power absorbed by said cooling apparatus 26 so as to determine the total energy absorbed to be correlated with the sum of the EnergyIce_Bank and the Energy_Cooling.

Naturally, the system also comprises temperature meters of the ambient surrounding the containers or drums 252, and the ambient surrounding the cooling apparatus 26.

Finally, the cooling apparatus 26 is connected to the dispensing line L", which is connected to dispensing members 27, such as taps and the like, for dispensing beer or the beverage in general.

The operation of the monitoring system 1 of the plant 2' described above is as follows.

During the normal operation, when the dispensing of beer is requested for example from said dispensing members 27, the pumps or compressors with which the dispensing apparatus 25 is provided pump or push the beer from the drums 252, transferring it to the cooling apparatus 26 through the hydraulic line L'.

The cooling apparatus 26 cools the beer before it reaches the dispensing members 27, through the dispensing line L".

During the beverage dispensing operations, the pressure sensors $S_{p\_bevanda}$ of said dispensing apparatus 25 (which in certain systems may also comprise carbon dioxide pressure sensors) detect the pressure on the hydraulic line L', thus allowing the volumes of dispensed beverage to be detected. It is worth noting that the internal pneumatic air pressure used by said dispensing apparatus 25 is measured at the same time, which naturally is a known design value. Given that the pressure of the pneumatic air and the detections of the pressure sensors $S_{p\_bevanda}$ on the line L' and the volumes are available, it is possible to determine the proper operation of the monitoring system 1.

Moreover, the power sensors detect both the power (that is the energy) absorbed over time by the dispensing apparatus 25 and by the cooling apparatus 26.

It is immediately apparent that the information collected and the signals detected in real time by the above-indicated sensors allow detecting operating patterns of the plant 2 so as to make possible the quick detection of any anomalies.

It is also worth noting that thanks to the sensors installed in the plant 2', the monitoring system 1 also makes it possible to autonomously detect any operating procedures that are different from the ordinary ones.

In particular, again considering the beer dispensing plant 2' shown in FIG. 3, it is known that beer is a product that may ferment. Therefore, regardless of the quantity of beer dispensed, the hydraulic circuit—formed by the hydraulic line L' and by the dispensing line L"—is to be disinfected and sanitized in the predefined or predefinable time ranges.

For this purpose, the dispensing apparatus 25 comprises the aforesaid washing module 253, which activates the sanitization process of the beer dispensing plant 2'.

When the dispensing apparatus 25 is not compatible with the monitoring unit 3 from a computing viewpoint, the latter is capable of recognizing the start of the process using the detections of the above-mentioned sensors.

Figure 7:
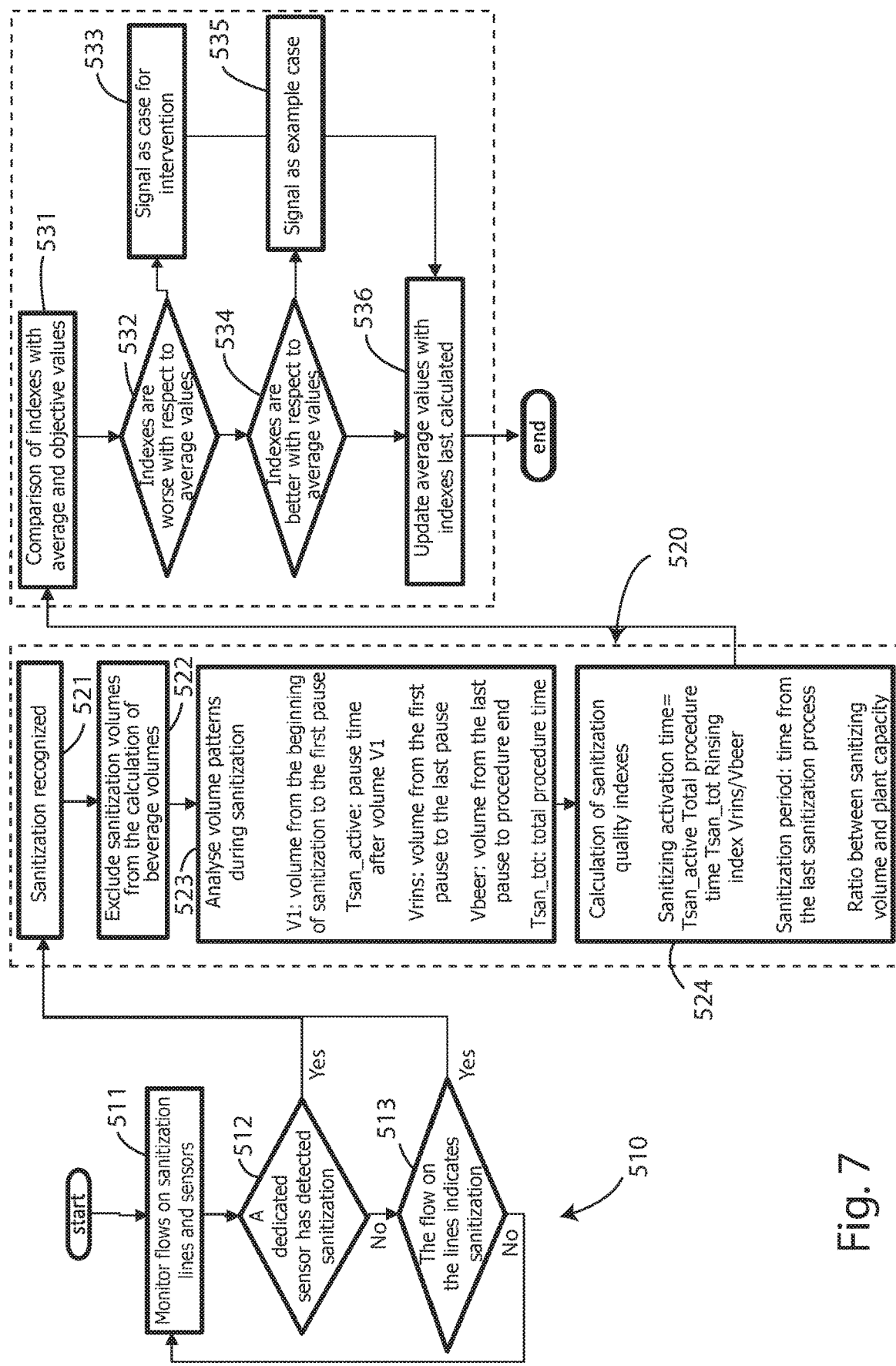
FIG. 7 shows a flow diagram of the operation of the monitoring system of the dispensing plant according to FIG. 3.

In particular reference to FIG. 7, it shows a flow diagram 500 of the operation wherein the monitoring unit 3 is capable of recognizing the sanitization process and detecting the data thereof.

In particular, the recognition and monitoring method comprises a detection step 510 where the monitoring unit 3 detects the start of the sanitization process, an acquisition step 520 where values of useful physical parameters of the dispensing apparatus 25 and the cooling apparatus 26 of the plant 2' are acquired or calculated over time using the detections of said sensors, and an analysis step 530 where the data obtained are analysed and the operation of the beer dispensing plant 2' is detected.

In particular, when the washing module 253 activates the sanitization apparatus 25, the sanitization process is started, in which sanitization liquid is emitted into the hydraulic line L' in order to clean the whole hydraulic circuit in which the beer or the beverage in general passes.

The pressure sensors $S_{P\_Aria}$, which in certain plants may also comprise the use of carbon dioxide itself, continue detecting the pressure of the liquids passing through the conduits on which they are positioned. Thus, it is possible to determine the volumes of liquid dispensed.

Moreover, at the same time the power sensors $S_{power}$ detect the absorption of power both by the sanitization apparatus 25 and by the dispensing apparatus 26 (reference here is made to the plant 2' in FIG. 3).

The operations performed in the detection step 510 comprise a control step 511, wherein the monitoring of the flows is started with specific flow sensors on the hydraulic line L', on the dispensing lines of the beer and the beverages from said containers 262 and of the sensors S of the plant 2.

Then, as shown in squares 512 and 513, the verification is performed as to whether the pressure sensors $S_{p\_Aria}$ detected a sanitization, that is if the flow of liquid passing on the hydraulic line L' and on the dispensing line L" indicate a sanitization activity.

If one of the two tests indicated in squares 512 and 513 is positive, the system 1 starts the acquisition step 520, recognizing it in the sub-step 521, otherwise the control unit 3 continues verifying if a sanitization operation was started, which in general occurs at predefined time ranges, according to the consumption and type of beverages dispensed.

Therefore, the process of excluding the sanitization volumes from the calculation of the beverage volumes 523 from the beer dispensing plant 2' starts in step 522.

The signals or patterns over time of the volumes during the actual sanitization step of the plant 2 are detected in sub-step 523. In particular, the following variable signals over time are detected:
V1: volume from the beginning of sanitization to the first pause
Tsan_active: pause time after volume V1;
Vrins: volume from the first pause to the last pause;
Vbeer: volume from the last pause to procedure end;
Tsan_tot: total procedure time.

The correlation between the implementation pressure of the valves detected by the pressure sensor $S_{p\_Aria}$, the volume dispensed and the duration of sanitization allows determining an optimal sanitization process of the plant 2'.

The sanitization quality indexes are calculated in sub-step 524 using the following group of parameters:
Sanitizing activation time: Tsan_active;
Total procedure time: Tsan_tot;
Rinsing index: Vrins/Vbeer;
Sanitization period: time from the last sanitization process;
Ratio between sanitizing volume and plant 2 capacity.

Then, once the sanitization of the beer dispensing plant 2' is complete, the analysis step 530 is started. In particular, the indexes that are detected and calculated are compared with objective average values in sub-step 531.

If the indexes shows worsening values with respect to the aforesaid average values (square 532), the need is signalled in sub-step 533 to perform a corrective intervention, for example extraordinary maintenance.

If the indexes shows improved values with respect to the aforesaid average values (square 534), the system 1 is used as an example case in sub-step 535.

In the last sub-step 536, the average reference values are updated with those of the indexes last calculated.

Then the control process is completed.

Figure 8:
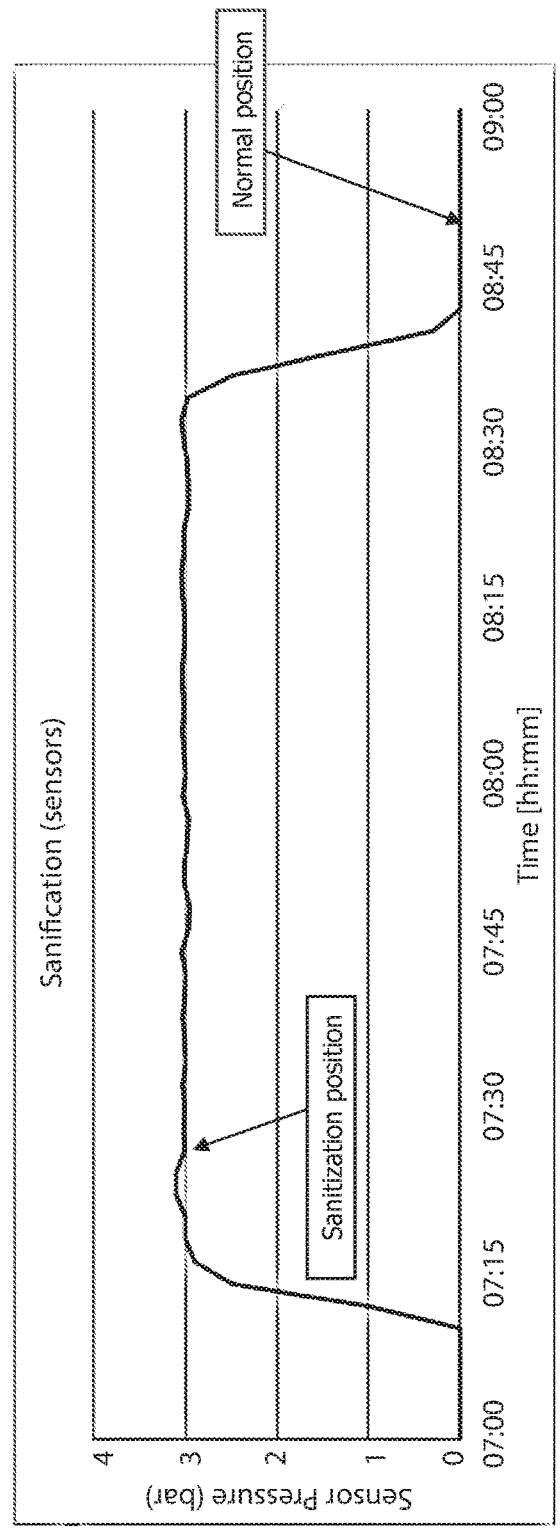
FIG. 8 shows a graph that indicates the signal detected by the pressure sensor as a function of time.
Figure 9:
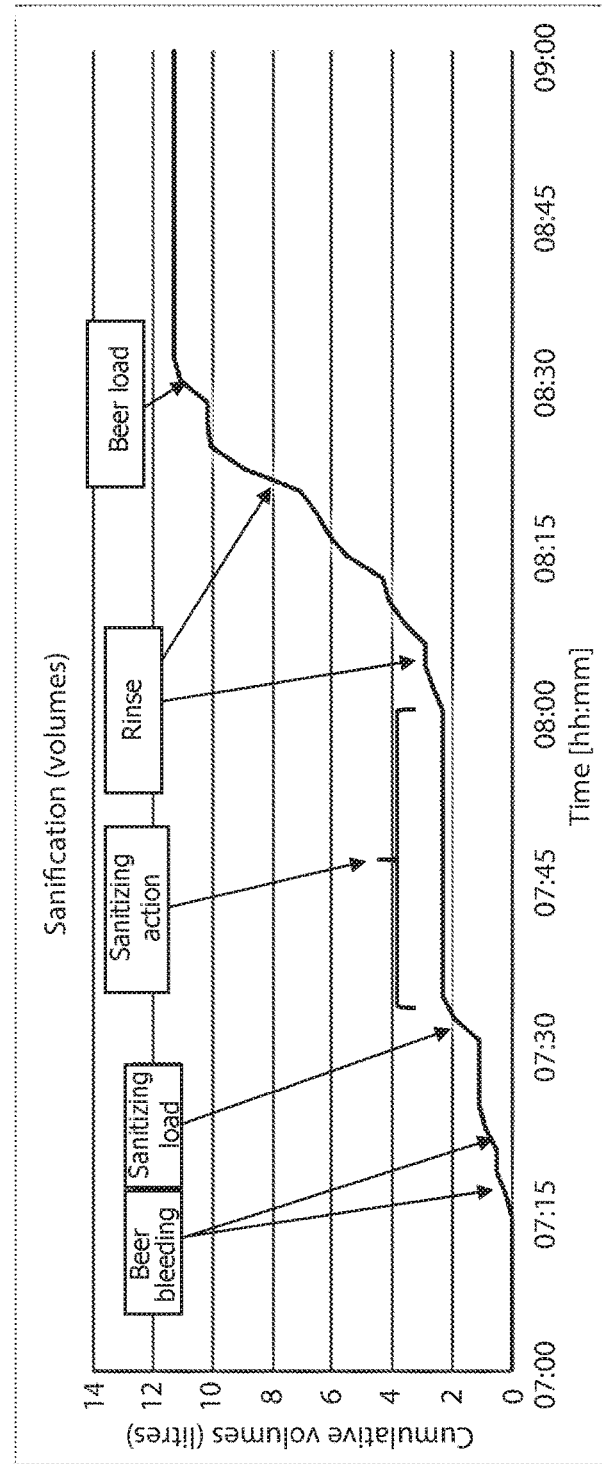
FIG. 9 shows a graph that indicates the signal detected by the liquid volume sensor on the line, as a function of time.

Referring now to FIGS. 8 and 9, graphs or patterns are shown of the signals detected by the pressure sensors $S_{p\_Aria}$ in a pneumatic control line and a volume (cumulative) line of liquid passing in a dispensing line.

FIGS. 8 and 9 show a first bleeding step, where the beverage in the hydraulic circuit is replaced with the disinfectant/sanitizer that is kept stationary in the circuit for an appropriate time interval so as to obtain the sanitizing action.

The hydraulic circuit is then rinsed by reintroducing the beverage. As is worth noting, the volume that cumulatively crosses the circuit in this rinsing step is high to allow the complete expulsion of the sanitized liquid before the regular beverage dispensing activity is resumed, thus filling the beer load in the circuit.

In such step, the circuit pressure detected by the pressure sensors $S_p$ substantially remains constant up to being lowered once the plant resumes regular operations and the sanitization process is complete.

As is worth noting, the monitoring unit 3 is capable of recognizing the start of a sanitization process of the beer dispensing plant 2' without the need for any sensor integrated in the apparatuses forming said plant. Moreover, once the procedure is finished, the monitoring unit 3 saves the data and the information collected and transmits them to a remote central unit for the collection and control thereof.

It is known that certain beverage dispensing systems comprise an electronically-controlled in-line cleaning system, and therefore it is capable of communicating when a sanitization operation begins.

Since certain cleaning systems use a pneumatic system as actuators, which through the pressurizing (about 3 bar) of pneumatic lines controls valves to cause the cleaning liquid, rinse liquid or the beverage to flow, it is possible to understand the status of cleanliness through the monitoring of the pressure of such lines.

This monitoring system uses pressure sensors on the pneumatic control lines of the cleaning systems to recognize the cleaning operations.

Thereby, it is avoided to interact and modify the cleaning system (made by other manufacturers) and the status thereof is recognized through the measurement alone of inlet and output parameters (for example, energy consumed and output pressure of the control lines).

The sanitization method according to the invention significantly improves the monitoring of the quality of the sanitization itself because it is known that given that the sanitization is an operation requiring time, it may be carried out in a quick manner to the detriment of the quality of the beverages subsequently dispensed, in particular if the sanitizing solution does not remain in the line for sufficient time or if the rinsing does not clean any trace of sanitizer.

As shown above, the sanitization method according to the invention achieves a compromise by analysing the flow on the beverage line over time, thus succeeding in:
eliminating the quantity of beverage measured but attributed to the sanitization process from the calculation of the quantity of beverage sold;
monitoring the time the sanitizing solution remains in the dispensing line since the sanitizing solution is to remain in the line for a sufficient time to act, which is defined by the plant manufacturer;
verifying the quantity of sanitizing solution used and therefore if it is capable of filling the whole line. If too small a quantity of sanitizing solution is used, the whole line does not come in contact with the solution, rather only the initial part, thus generating a partial sanitization;
verifying the quantity of rinse liquid used and therefore if it is capable of removing all sanitizer residue. The rinsing volume is to be greater than a safety factor (defined by the beverage manufacturer or by the plant manufacturer) related to the volume of beverage contained in the plant itself;
directly measuring the volume required for each plant. It is very important to determine the volume of the line since the volume of beverage in each plant is different from the other because it consists of the sum of the volume in the machine and the volume of the line up to the taps, and therefore it is a function of the individual installation or plant (think for example of an installation or plant where the machine is in the cellar and the dispensing taps are in a different room on the upper floor). This is done after the rinsing step when the operator fills the beverage line again. Since an attempt is made not to waste costly beverage, this measurement is sufficiently accurate. The value obtained—also averaged over several cleaning operations—is used to calculate the indexes during the subsequent cleaning operations, as mentioned above. An advantage of the invention is the one of allowing the detection of operating parameters and indexes of a plant or of apparatuses forming a plant without the need to make specific modifications to the electronics and the operating system of the system of each of said apparatuses.

The invention is described by way of example only, without limiting the scope of application, according to its preferred embodiments, but it shall be understood that the invention may be modified and/or adapted by experts in the field without thereby departing from the scope of the inventive concept, as defined in the claims herein.

What is claimed is:

1. A monitoring system for controlling a plant, for dispensing beverages
said plant comprising one or more apparatuses connected to one another or to other apparatuses external to said plant, by electrical, pneumatic or hydraulic lines,
wherein said monitoring system comprises
a plurality of detection sensors ($S_{power}$, $S_{CO2}$, $T_{ambiente\ (bevanda)}$, $T_{ambiente\ (impianto)}$, $S_{p\_Aria}$) for detecting a corresponding physical parameter is positioned on at least one of said electrical, pneumatic or hydraulic lines, and
a monitoring unit provided with transceiver means and connected to said detection sensors ($S_{power}$, $S_{co2}$, $T_{ambiente\ (bevanda)}$, $T_{ambiente\ (impianto)}$, $S_{p\_Aria}$),
wherein said monitoring unit is configured to receive the data detected by said detection sensors ($S_{power}$, $S_{co2}$, $T_{ambiente\ (bevanda)}$, $T_{ambiente\ (impianto)}$, $S_{p\_Aria}$), determine the values and trends over time of the respective parameters of said detection sensors ($S_{power}$, $S_{co2}$, $T_{ambiente\ (bevanda)}$, $T_{ambiente\ (impianto)}$, $S_{p\_Aria}$) by comparing them with average variable values and/or trends so as to detect and verify the operation of said control system in one or more operating steps;
at least one power sensor ($S_{power}$) for detecting the power or energy absorption of said at least one of said apparatuses, said at least one power sensor ($S_{power}$) being positioned to detect energy absorbed, defined as a sum between energy of an ice bank, given by the consumption of energy required to preserve the ice bank, due to the outward exchange of the plant, and a cooling energy, given by the consumption to cool the beverage consumed;
wherein said monitoring unit is connected to said at least one power sensor ($S_{power}$) and comprises one or more sensors of the ambient temperature ($T_{ambiente\ (impianto)}$) surrounding said plant to be monitored, wherein said temperature sensors are connected to said monitoring unit capable to detect a quantity of beverage dispensed ($Q_{bevanda}$) by said plant to be monitored, wherein such quantity of dispensed beverage ($Q_{bevanda}$) is available to said monitoring unit;
wherein said monitoring unit configured to perform said correlation operations by verifying if overall energy absorbed by said plant is comprised within a pair of curves given by a sum of two pairs of absorption curves, (E' max and E' min and E" max and E" min), where the first pair of absorption curves ($E'_{Max}$ and $E'_{Min}$) is dynamically variable as a function of the ambient temperature ($T_{ambiente\ (impianto)}$) surrounding said plant, and the second pair of absorption curves ($E"_{Max}$ and $E"_{Min}$) is dynamically variable as a function of the quantity of beverage dispensed ($Q_{bevanda}$) by said plant, so as to determine that said plant operates properly, otherwise determining that said plant does not operate properly;
wherein said monitoring unit is also configured to execute correlation operations between said parameters to verify the operation of said plant;
at least one electric interface having a female electrical socket in which there may be inserted a power supply plug of a respective apparatus to be monitored; and
a male electrical socket that is connectable to a supply source, said power sensor ($S_{power}$) being inserted between said female electrical socket and said male electrical plug.

2. The system according to claim 1, wherein
said plant comprises at least one hydraulic line (L, L') for implementing hydraulic valves and
wherein said pressure sensor ($S_{p\_Aria}$) is interposed between a first and a second apparatus of said plant to detect the implementation pressure of said hydraulic valves so as to determine the quantity of dispensed beverage ($Q_{bevanda}$) on the basis of the flow rate of the beverage dispensing conduits.

3. The system according to claim 1, wherein one or more of said apparatuses comprises one or more internal sensors installed internally, designed to detect physical operating parameters of the respective apparatus, said internal sensors being operatively connected with said monitoring unit for the transmission of the detected data related to said physical operating parameters.

4. The system according to claim 1, wherein
said sensors comprise one or more pressure sensors of the carbon dioxide ($S_{co2}$) of respective beverage containers (252), which are connected to said monitoring unit,
wherein said sensors comprises one or more sensors ($T_{ambiente\ (bevanda)}$) of the ambient temperature where said beverage containers are stored, which are connected to said monitoring unit; and
wherein said monitoring unit configured to perform-said correlation operations by verifying if the carbon dioxide pressure falls within a pair of pressure curves ($P_{Max}$ and $P_{Min}$) that are dynamically variable as a function of the ambient temperature where said beverage containers are stored such that if said carbon dioxide pressure is within said pressure curves ($P_{Max}$ and $P_{Min}$), then said monitoring unit determines that said plant operates properly, otherwise it determines that said plant does not operate properly.

5. The system according to claim 1, wherein said power sensor ($S_{power}$) is interposed in the supply line of one or more of said apparatuses to detect the power absorbed thereby.

6. The system according to claim 1, wherein said power sensor ($S_{power}$) comprises a voltage meter and a Hall Effect current meter.

7. The system according to claim 1, wherein the dispensing plant for dispensing a beverage comprises a dispensing apparatus, a cooling apparatus for cooling the beverage to be dispensed, a hydraulic line (L') for connection between said dispensing apparatus and said cooling apparatus through which line said beverage to be dispensed passes, and a dispensing line (L") output connected to said cooling apparatus, through which line the cooled beverage passes;
a first power sensor ($S_{power}$) interposed between a mains and said dispensing apparatus, connected to said monitoring unit;
a second power sensor ($S_{power}$) interposed between the mains and said cooling apparatus, connected to said monitoring unit; and
one or more pressure sensors ($S_{p\_Aria}$) for detecting the pressure of the beverage on said line of hydraulic line and on said dispensing line, which are connected to said monitoring unit.

8. The system according to claim 7, wherein the dispensing apparatus comprises a washing module (253) adapted to start a sanitization process of said beverage dispensing plant at predefined and/or predefinable time intervals; and in that said monitoring unit is configured to carry out the following steps:

detection, wherein it detects the start of the sanitization process;

acquisition, wherein it acquires the values over time of the parameters of said dispensing apparatus and said cooling apparatus; and analysis, wherein the data obtained related to said parameters of said dispensing apparatus and said cooling apparatus are analysed and the operation of the beverage dispensing plant is detected.

9. The system according to claim 8, wherein said detection step comprises the following sub-steps:

control, wherein the monitoring is started of the flows on said hydraulic line, on said dispensing line and of said sensors ($S_p$, $S_{power}$) of said beverage dispensing plant; and verification if said pressure sensors ($S_p$) have detected a sanitization; if positive, said acquisition step is started.

10. The system according to claim 8, wherein said acquisition step comprises the following sub-steps:

recognition of the sanitization process;

calculation by excluding the volumes of the sanitization from the ones of the beverage;

detection of the signals or patterns over time of the volumes with the detection of a group of parameters; and calculation of a group of sanitization quality indexes.

11. The system according to claim 10, wherein said group of parameters comprises the following parameters:

V1: volume from the beginning of sanitization to the first pause;

Tsan_active: pause time after volume V1;

Vrins: volume from a first pause to the last pause;

Vbeer: volume from a last pause to procedure end;

Tsan_tot: total procedure time; and in that said group of indexes comprises the following indexes:

Sanitizing activation time: Tsan_active;

Total procedure time: Tsan_tot;

Rinsing index: Vrins/Vbeer;

Sanitization period: time from the last sanitization process;

Ratio between sanitizing volume and plant capacity.

12. The system according to claim 8, wherein said analysis step comprises the following sub-steps:

comparison of the value of the data related to said parameters of said dispensing apparatus and said cooling apparatus with objective average values;

if said comparison shows worsening values with respect to said average values, signalling the need to perform a maintenance operation;

if said comparison shows improved values with respect to said average values, detection of the optimal operation of the monitoring system; and update of the average reference values with those of the last indexes detected and calculated.

13. A method for detecting and monitoring the sanitization of a beverage dispensing plant, said plant having a dispensing apparatus and a cooling apparatus, said method comprising the following steps:

detection of the start of a sanitization process;

acquisition of the values over time of the parameters of said dispensing apparatus and said cooling apparatus; and analysis, wherein the data obtained related to said parameters of said dispensing apparatus and said cooling apparatus are analysed and the operation of the beverage dispensing plant is detected;

characterised in that said acquisition step comprises the following sub-steps:

recognition of the sanitization process;

calculation by excluding volumes of the sanitization from volumes of the beverage;

detection of the signals or patterns over time of the beverage volumes with the detection of a group of parameters; and—calculation of a group of sanitization quality indexes;

using at least one power sensor ($S_{power}$) for detecting the power or energy absorption of said at least one of said apparatuses, said at least one power sensor ($S_{power}$) being positioned to detect energy absorbed, defined as a sum between energy of an ice bank, given by the consumption of energy required to preserve the ice bank, due to the outward exchange of the plant, and cooling energy, given by the consumption to cool the beverage consumed;

wherein a monitoring unit is connected to said at least one power sensor ($S_{power}$) and comprises one or more sensors of ambient temperature ($T_{ambiente\ (impianto)}$) surrounding said plant to be monitored, wherein said temperature sensors are connected to said monitoring unit capable to detect quantity of beverage dispensed ($Q_{bevanda}$) by said plant to be monitored, wherein such quantity of dispensed beverage ($Q_{bevanda}$) is available to said monitoring unit;

wherein said monitoring unit configured to perform said correlation operations by verifying if overall energy absorbed by said plant is comprised within a pair of curves given by a sum of two pairs of absorption curves, ($E'_{max}$ and $E'_{min}$ and $E''_{max}$ and $E''_{min}$), where the first pair of absorption curves ($E'_{max}$ and $E'_{Min}$) is dynamically variable as a function of ambient temperature ($T_{ambiente\ (impianto)}$) surrounding said plant, and the second pair of absorption curves ($E''_{Max}$ and $E''_{Min}$) is dynamically variable as a function of the quantity of beverage dispensed ($Q_{bevanda}$) by said plant, so as to determine that said plant operates properly, otherwise determining that said plant does not operate properly;

having at least one electric interface having a female electrical socket in which there may be inserted a power supply plug of a respective apparatus to be monitored; and having a male electrical socket that is connectable to a supply source, said power sensor ($S_{power}$) being inserted between said female electrical socket and said male electrical plug.

14. The method according to claim 13, wherein said detection step comprises the following sub-steps:

control (511), wherein the monitoring is started of the beverage flows on a hydraulic line and/or on a dispensing line and/or of sensors ($S_p$, $S_{power}$) of said beverage dispensing plant; and verification if said pressure sensors ($S_p$) have detected a sanitization; if positive, said acquisition step is started.

15. The method according to claim 13, wherein the group of parameters comprises the following parameters:

V1: volume from the beginning of sanitization to the first pause;

Tsan_active: pause time after volume V1;
Vrins: volume from the first pause to the last pause;
Vbeer: volume from the last pause to procedure end;
Tsan_tot: total procedure time; and
in that said group of indexes comprises the following indexes:
Sanitizing activation time: Tsan_active;
Total procedure time: Tsan_tot;
Rinsing index: Vrins/Vbeer;
Sanitization period: time from the last sanitization process;
Ratio between sanitizing volume and plant capacity.

16. The method according to claim 13, wherein the said analysis step comprises the following sub-steps:
comparison of the value of the data related to said parameters of said dispensing apparatus and said cooling apparatus with objective average values;
if said comparison shows worsening values with respect to said average values, signalling the need to perform a maintenance operation;
if said comparison shows improved values with respect to said average values, detection of the optimal operation of the monitoring system; and
update of the average reference values with those of the last indexes detected and calculated.

* * * * *